(12) United States Patent
Fujii

(10) Patent No.: US 9,328,012 B2
(45) Date of Patent: May 3, 2016

(54) GLASS BASE MATERIAL ELONGATING METHOD

(71) Applicant: Shin-Etsu Chemical Co., Ltd., Tokyo (JP)

(72) Inventor: Hideki Fujii, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 36 days.

(21) Appl. No.: 14/320,652

(22) Filed: Jul. 1, 2014

(65) Prior Publication Data

US 2015/0007616 A1 Jan. 8, 2015

(30) Foreign Application Priority Data

Jul. 2, 2013 (JP) ................. 2013-138591

(51) Int. Cl.
*C03B 37/012* (2006.01)
*C03B 23/045* (2006.01)
*C03B 23/047* (2006.01)

(52) U.S. Cl.
CPC ......... *C03B 37/01242* (2013.01); *C03B 23/045* (2013.01); *C03B 23/047* (2013.01); *C03B 37/0126* (2013.01); *Y02P 40/57* (2015.11)

(58) Field of Classification Search
CPC ................. C03B 37/0124; C03B 37/01242; C03B 23/047
See application file for complete search history.

(56) References Cited

U.S. PATENT DOCUMENTS

| | | | |
|---|---|---|---|
| 2005/0138970 A1* | 6/2005 | Saitoh | C03B 37/01242 65/393 |
| 2006/0086148 A1* | 4/2006 | Mileo | C03B 37/01242 65/382 |
| 2010/0005837 A1* | 1/2010 | Nakanishi | C03B 23/047 65/382 |

FOREIGN PATENT DOCUMENTS

| | | | |
|---|---|---|---|
| JP | 2749669 B2 | * | 5/1998 |
| JP | 2004-123400 A | | 4/2004 |
| JP | 4443433 B2 | | 3/2010 |

* cited by examiner

*Primary Examiner* — Erin Snelting

(57) ABSTRACT

To manufacture glass base material with high manufacturing yield, provided is a glass base material elongating method comprising forming a tapered portion where the outer diameter of the glass base material changes continuously, holding the glass base material with chucks, heating the glass base material held by chucks with a heat source, and with a portion of the glass base material softened, increasing the distance between the chucks to elongate the glass base material. The elongation begins from a state in which a position of the heat source at a position at which the outer diameter of the glass base material is set in a range from no less than 95% to no more than 98% of an average outer diameter of the trunk portion of the glass base material.

18 Claims, 5 Drawing Sheets

GLASS BASE MATERIAL ELONGATING METHOD

The contents of the following Japanese patent application are incorporated herein by reference:
NO. 2013-138591 filed on Jul. 2, 2013.

BACKGROUND

1. Technical Field

The present invention relates to a glass base material elongating method.

2. Related Art

A glass base material for an optical fiber has its outer diameter and length adjusted by an elongating process using an elongation apparatus. As a result, the glass base material is formed to correspond to the specifications of the drawing equipment. Patent Document 1 describes a method for, when elongating a glass base material, determining the reference outer diameter position of the glass base material.
Patent Document 1: Japanese Patent No. 4443433

When elongating the glass base material, it is easy for outer diameter fluctuation, which is fluctuation in the outer diameter across the longitudinal direction, to occur during the initial portion of the elongating. In the portions where outer diameter fluctuation occurs, there is a decrease in the quality of the product, e.g. the optical fiber, obtained from the drawing. Therefore, the outer diameter fluctuation of the glass base material causes a drop in the yield.

SUMMARY

According to a first aspect of the present invention, provided is a glass base material elongating method comprising holding of holding, with a pair of chucks, longitudinal ends of a glass base material that has a trunk portion and a tapered portion, which is located on one end of the trunk portion and has an outer diameter that changes along a longitudinal direction; heating of heating, with a heat source, a heated region that is a portion in the longitudinal direction of the glass base material held by the pair of chucks; and elongation of elongating the glass base material by increasing distance between the pair of chucks in the longitudinal direction of the glass base material, with a portion of the glass base material being in a softened state due to the heating by the heat source. The elongation begins from a state in which a position of the heat source indicated by a center of the heated region is at an elongation start position, which is a position in the tapered portion at which the outer diameter of the glass base material is set in a range from no less than 95% to no more than 98% of an average outer diameter of the trunk portion.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
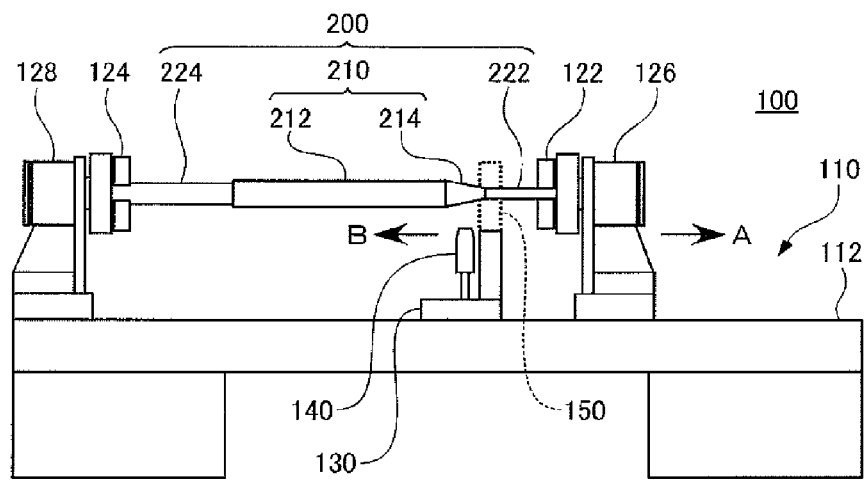
FIG. 1 is a schematic view of the glass lathe 100.

FIG. 1 is a perspective view of the glass lathe 100. The glass lathe 100 can be used as an elongating apparatus when elongating a glass base material 210. The glass lathe 100 is shown in a state supporting a glass base material assembly 200, which includes a glass base material 210 and dummy rods 222 and 224.

The glass lathe 100 includes a surface plate 110, a pair of chucks 122 and 124, and a moving stand 130. The surface plate 110 has a flat ceiling 112 that is fixed horizontally.

The pair of chucks 122 and 124 are arranged on the ceiling 112 of the surface plate 110, and hold the ends of a glass base material assembly 200, which is parallel to the ceiling 112. The pair of chucks 122 and 124 are respectively driven by rotational drive units 126 and 128, thereby enabling the held glass base material assembly 200 to be rotated on a rotational axis that extends in the longitudinal direction of the glass base material 210.

At least one of the pair of chucks 122 and 124 moves in the longitudinal direction of the held glass base material assembly 200. As a result, the space between the pair of chucks 122 and 124 can be changed.

The moving stand 130 is arranged on the ceiling 112 of the surface plate 110, and has a heat source 140 and a diameter measurement device 150 mounted thereon. The moving stand 130 moves in the longitudinal direction of the glass base material assembly 200 held by the pair of chucks 122 and 124, on the ceiling 112 integrally with the heat source 140 and the diameter measurement device 150 mounted thereon.

An oxyhydrogen flame, for example, can be used as the heat source 140 to heat the glass base material assembly 200 held by the pair of chucks 122 and 124 from the outer surface. A laser diameter measurement device can be used as the diameter measurement device 150.

With the glass lathe described above, by using the heat source 140 to heat the glass base material 210 while the glass base material 210 is being held by the chucks 122 and 124, a portion of the glass base material 210 in the longitudinal direction can be heated and softened through melting. By heating the glass base material 210 while the glass base material 210 is rotated by the rotational drive units 126 and 128, a portion of the glass base material 210 in the longitudinal direction can be heated uniformly in the circumferential direction.

Furthermore, by moving at least the one chuck 122 in the direction of the arrow A in FIG. 1 to increase the distance between the pair of chucks 122 and 124, while a portion of the glass base material 210 is in the melted and softened state, it is possible to elongate the glass base material 210. The portion of the glass base material 210 that has been elongated has a reduced outer diameter.

While the heating by the heat source 140 and the elongating by the chucks 122 and 124 continues, the moving stand 130 moves the heat source 140 in the longitudinal direction of the glass base material 210 indicated by the arrow B in FIG. 1. As a result, substantially the entire length of the glass base material 210 can be elongated. In this way, elongation begins from an elongation start position at which one end of the glass base material 210 is positioned, and continues until an elongation end position at which the other end of the glass base material 210 is positioned, thereby enabling elongation of substantially the entire length of the glass base material 210.

The glass base material 210 being elongated can be manufactured using outer vapor deposition (OVD), for example. With OVD, an oxyhydrogen flame burner is provided with oxygen gas, hydrogen gas, and silicon tetrachloride serving as the glass raw material, in order to generate an oxyhydrogen flame. The glass microparticles generated by the hydrolysis reaction in the oxyhydrogen flame are deposited on the surface of the core material. In this way, a porous glass layer is formed on the surface of the core base material.

Furthermore, the porous glass layer is dehydrated and sintered to undergo transparent vitrification, thereby forming a transparent glass base material 210. At least a portion of the glass base material 210 obtained in this manner forms a trunk portion 212 with a substantially constant outer diameter in the longitudinal direction. The outer diameter and length of the glass base material 210 are adjusted according to the equipment used for the process of drawing the optical fiber. The manufacturing of the glass base material 210 is not limited to using OVD, and other manufacturing methods such as vapor axial deposition (VAD) or modified chemical vapor deposition (MCVD) may be used.

The dummy rods 222 and 224 are fused to one or both ends of the glass base material 210 in the longitudinal direction to form the glass base material assembly 200, which may be held by the glass lathe 100. The glass base material assembly 200 including the dummy rods 222 and 224 is held in the glass lathe 100 by having the ends of the dummy rods 222 and 224 gripped by the chucks 122 and 124.

In this way, the chucks 122 and 124 can be prevented from damaging the glass base material 210. In other words, when there is already a defect such as bubbles or scratches on an end of the glass base material 210, the glass base material 210 may be gripped directly by the chucks 122 and 124, and the dummy rods 222 and 224 need not be used.

In a case where the dummy rod 222 is fused to one end of the glass base material 210, when the glass base material 210 is elongated, this one end may be the end on the side where the elongation starts, for example. In this case, the dummy rod 224 added in a case where the dummy rods 222 and 224 are attached to respective ends of the glass base material 210 is arranged on the end that is on the elongation end side of the glass base material 210.

The glass base material 210 is adjacent to at least the end on the side where elongation starts, and may have a tapered portion 214 with an outer diameter that gradually decreases in a direction approaching the end of the glass base material 210 in the longitudinal direction of the glass base material 210. The tapered portion 214 can be formed by grinding the glass base material 210, for example. In this way, the glass base material 210 includes a trunk portion 212 that has a substantially constant outer diameter in the longitudinal direction and a tapered portion 214 that has a continuously changing outer diameter.

When the glass base material 210 is provided with the tapered portion 214, the outer diameter of the dummy rod 222 fused to the end of the glass base material 210 where the tapered portion 214 is provided may be equal to the outer diameter of the end of the tapered portion 214. In this way, in the glass base material assembly 200 including the dummy rod 222, the outer diameter changes continuously through the trunk portion 212, the tapered portion 214, and the dummy rod 222. Furthermore, the dummy rods 222 and 224 can be formed of a material having the same or similar composition as the glass base material 210.

As described above, when the glass base material 210 serving as the glass base material assembly 200 is elongated, first, the glass base material 210 is held by the glass lathe 100 by gripping the chucks 122 and 124 via the dummy rods 222 and 224. Next, the diameter measurement device 150 is used to measure the outer diameter of the glass base material 210 before elongation.

Figure 2:
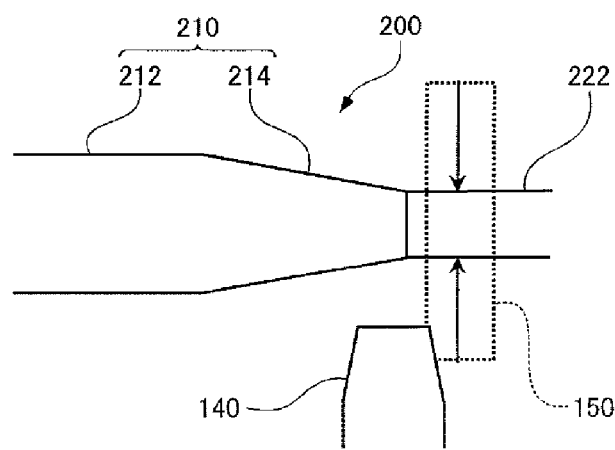
FIG. 2 is a schematic view of the diameter measurement device 150 of the glass lathe 100.

FIG. 2 is a schematic view of the diameter measurement device 150 in the glass lathe 100. The diameter measurement device 150 is arranged near the heat source 140 in the longitudinal direction of the glass base material 210, and measures the outer diameter of the glass base material assembly 200.

The diameter measurement device 150 moves together with the heat source 140 when the moving stand 130 moves. Accordingly, when the diameter measurement device 150 is arranged in front of the heat source 140 in the movement direction of the moving stand 130, the diameter measurement device 150 measures the outer diameter of the glass base material assembly 200 immediately before elongation. Furthermore, when the diameter measurement device 150 is arranged behind the heat source 140 in the movement direction of the moving stand 130, the diameter measurement device 150 measures the outer diameter of the glass base material assembly 200 immediately after elongation.

When the glass lathe 100 is used to elongate the glass base material 210, the elongation conditions including the heating amount of the heat source 140, the movement velocity $V_b$ [mm/min] of the heat source 140 (moving stand 130), and drawing velocity $V_t(z)$ [mm/min] of the glass base material 210 due to the movement of the chucks 122 and 124 are set based on the value of the outer diameter before elongation obtained by measuring the glass base material 210 to be elongated and the value of a target outer diameter, which is the target outer diameter after the elongation.

The heating and elongating of the glass base material 210 can be performed at the same time as the outer diameter measurement and the calculation of the elongation conditions. However, there are cases where the outer diameter control accuracy will be affected by the skew between the position at which the diameter measurement device 150 measures the outer diameter of the glass base material 210 and the position at which the heated and melted glass base material 210 is elongated.

Therefore, before heating and elongating the glass base material 210, the outer diameter of the glass base material 210 is measured across its entire longitudinal direction using the diameter measurement device 150, without the heat source 140 applying heat. In this way, the outer diameter distribution across the longitudinal direction of the glass base material 210 to be elongated is obtained in advance, and the elongation conditions can be accurately calculated by calculating the average outer diameter of the glass base material 210 to be elongated based on the acquired outer diameter distribution.

When a glass base material 210 having an outer diameter $D_1$ [mm] before elongation is elongated to have a target outer diameter $D_2$ [mm], the movement velocity $V_b$ [mm/min] of the heat source 140 and the drawing velocity $V_r(z)$ [mm/min] can be calculated as shown in Expression 1 below. Here, the variable z refers to a position z [mm] in the longitudinal direction of the glass base material 210, and $D_2(z)$ refers to the outer diameter of the glass base material 210 at the position z.

$$V_r(z) = V_b \times \left( \frac{D_2^2}{D_1(z)^2} - 1 \right)$$ Expression 1

When elongating the glass base material 210 with the heating conditions set as shown above, first, with relative movement between the heat source 140 and the glass base material 210 stopped, the glass base material 210 is heated by the heat source 140. Next, after the heated portion of the glass base material 210 has reached a temperature sufficient for melting and softening, the heat source 140 is moved with the previously calculated velocity $V_b$ [mm/min].

The glass base material 210 is elongated by increasing the distance between the chucks 122 and 124 at the drawing velocity $V_r(z)$ [mm/min] corresponding to the longitudinal position [mm] of the portion of the glass base material 210 that has been melted and softened. The elongation process of the glass base material 210 continues until the portion being melted, softened, and elongated reaches the elongation end position.

Figure 3:
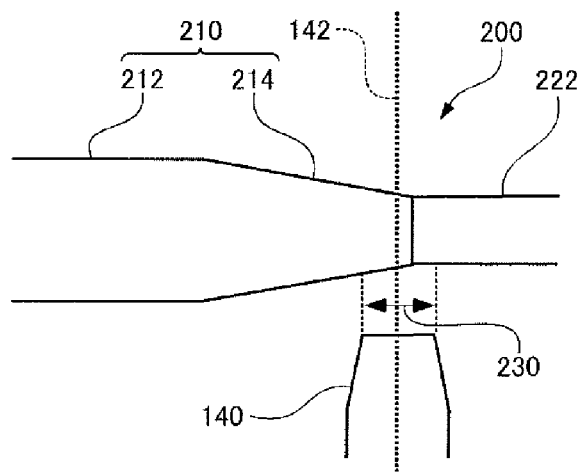
FIG. 3 is a schematic view of the heat source 140 of the glass lathe 100.

FIG. 3 is a schematic view of the heating position 142 at which the heat source 140 heats the glass base material 210 during the elongation process of the glass base material 210. The heat source 140 heats the glass base material 210 using an oxyhydrogen flame, for example, and therefore the glass base material 210 is heated in a heated region 230 that has a finite width in the longitudinal direction. The center of the heated region 230 heated by the heat source 140 in the longitudinal direction of the glass base material 210 is the heating position 142 of the heat source 140.

When elongating the glass base material 210, at least one of the chucks 122 and 124 is moved with the melted and softened glass base material 210 at the heating position 142. In this way, the portion of the glass base material 210 that is melted and softened is elongated.

When beginning the glass base material 210 elongation process, there may be a preheating step of heating the glass base material 210 from a heating position 142 at a more forward position of the glass base material 210 in the movement direction of the heat source 140 instead of the heating position 142 corresponding to the elongation start position where the elongation begins. In this way, the heating conditions of the glass base material 210 at the elongation start position become the same as the heating conditions of the glass base material 210 during the elongation process, and the outer diameter of the elongated glass base material 210 can be stabilized at the elongation start position.

The heating start position during the preheating step may be in a range from a position equal to or farther than 50% of the average outer diameter of the glass base material 210 before elongation from the heating position 142 at the time when heating begins. When the heating start position during the preheating step is closer to the elongation start position than allowed by the above range, there is not a sufficient moving distance from the unheated region to the elongation start position. As a result, the thermal gradient formed in the glass base material 210 by the heating becomes steep, and localized high temperature portions occur in the portion of the glass base material 210 that has been melted and softened. Accordingly, the melted and softened portion of the glass base material 210 extends and contracts in a concentrated manner, which reduces the stability of the outer diameter of the glass base material 210.

The heating start position in the preheating step is not particularly limited on the far end of the range described above, when considering the stability of the outer diameter immediately after the start of elongation. However, if the preheating start position is too far from the elongation start position, then the movement distance of the heat source 140 in the preheating step becomes long and the time needed for preheating increases. Furthermore, the amount of fuel consumed by the preheating increases.

Accordingly, the heating start position of the heat source 140 in the preheating step is preferably no farther from the heating position at the time when elongation starts than 300% of the average outer diameter of the glass base material 210 before elongation. Furthermore, the conditions of being no less that 50% of the average outer diameter and no more than 300% of the average outer diameter of the glass base material 210 allow for a margin, but these conditions are preferably no less than 100% and no more then 200%.

Next, in the preheating step, the moving stand 130 moves the heat source 140. As a result, the heating position 142 of the glass base material 210 due to the heat source 140 moves toward the melted and softened portion of the glass base material 210 when the elongation begins. The melted and softened portion formed in the glass base material 210 during elongation may have a width close to the outer diameter of the base material, in the longitudinal direction of the glass base material 210.

Figure 4:
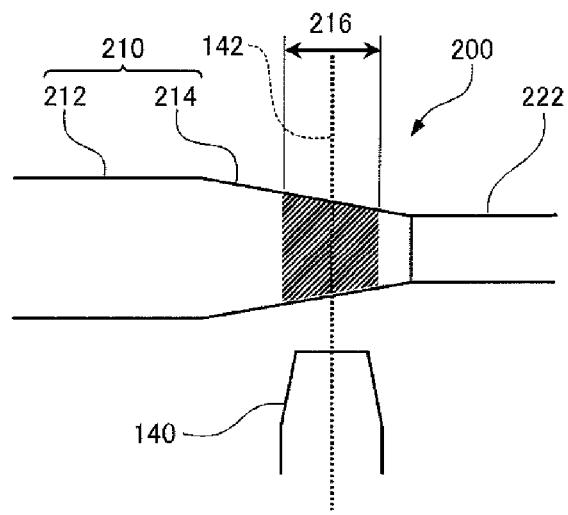
FIG. 4 is a schematic view of the melted and softened portion 216 of the glass base material 210.

FIG. 4 is a schematic view of the melted and softened portion 216 in the glass base material 210. As shown in FIG. 4, in the glass base material 210 heated by the heat source 140, a heated region 230, which is centered on the heating position 142 and expands to both sides of the glass base material 210 in the longitudinal direction, is heated. When the temperature of the heated region 230 increases, a melted and softened portion 216 with a width in the longitudinal direction of the glass base material 210 is formed in the glass base material 210.

Since the heated region 230 has a width in the longitudinal direction of the glass base material 210, when the heating position 142 is positioned at the tapered portion 214 of the glass base material 210, the melted and softened portion 216 includes a portion where the outer diameter of the glass base material 210 is less than that of the heating position 142 and a portion where the outer diameter of the glass base material 210 is greater than that of the heating position 142. As a result, In the elongated glass base material 210, there is still a difference in the outer diameter after elongation in front of and behind the heating position 142 within the melted and softened portion 216.

As an example, a case in which a glass base material 210 with an average outer diameter of 100 mm before elongation is elongated to a target outer diameter of 60 mm is observed. The position at which the outer diameter of the tapered portion 214 of the glass base material 210 is 70 mm is set as the heating position 142 of the heat source 140, and the glass base material 210 is heated. Next, with the melted and softened portion 216 of the glass base material 210 in a softened state, the chucks 122 and 124 of the glass lathe 100 are moved to increase the distance therebetween, thereby elongating the glass base material 210.

The movement velocity (drawing velocity) of the chucks 122 and 124 is calculated with the condition that a glass base material having an outer diameter of 70 mm is elongated to a target outer diameter of 60 mm. However, The outer diameter of the glass base material 210 in the tapered portion 214 changes continuously in the longitudinal direction of the glass base material 210. Therefore, in the melted and softened portion 216, portions with an outer diameter greater than 70 mm and portions with an outer diameter less than 70 mm are both elongated with the same conditions as a case where the outer diameter is 70 mm. Therefore, when thinking of the heating position as a fixed position, there are portions having different elongation conditions within a single melted and softened portion 216.

Figure 5:
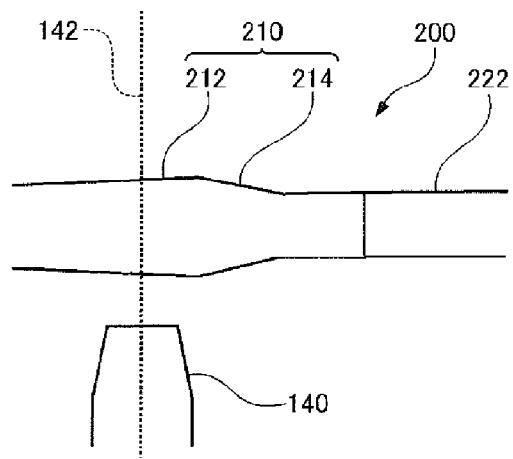
FIG. 5 is a partial schematic view of the elongated glass base material 210.

FIG. 5 is a schematic view of an elongated glass base material 210. With the glass base material 210 heated to form the melted and softened portion 216, as described above, the distance between the chucks 122 and 124 is increased to enable elongation of the glass base material 210 in the melted and softened portion 216. However, at the time when the elongation is begun, there are cases where the melted and softened portion 216 is excessively elongated and the outer diameter of the elongated glass base material 210 is less than the target outer diameter.

Furthermore, when moving the heat source 140 and the chucks 122 and 124 to continue the elongation of the glass base material 210, if a segment is created with a smaller outer diameter than the target outer diameter due to excessive elongation, then there is insufficient reduction of diameter due to the elongation in segments adjacent to this segment, which results in segments with outer diameters greater than the target outer diameter after elongation. In this way, in the elongated glass base material 210, segments in which the diameter reduction caused by the elongation is excessive are followed by segments in which the diameter reduction is insufficient, and segments in which the diameter reduction caused by the elongation is insufficient are followed by segments in which the diameter reduction is excessive. Therefore, when there is a single deviation where the outer diameter of the elongated glass base material 210 differs from the target outer diameter, the outer diameter of the elongated glass base material 210 ultimately fluctuates repeatedly.

This outer diameter fluctuation repeats in an alternating manner from the elongation start position toward the elongation end position, but converges as the elongation of the glass base material 210 progresses. Accordingly, by selecting the position at which the outer diameter of the elongated glass base material 210 has reached an outer diameter after the fluctuation due to elongation has converged and then beginning elongation, the outer diameter fluctuation after elongation can be restricted from immediately after elongation is begun.

Figure 6:
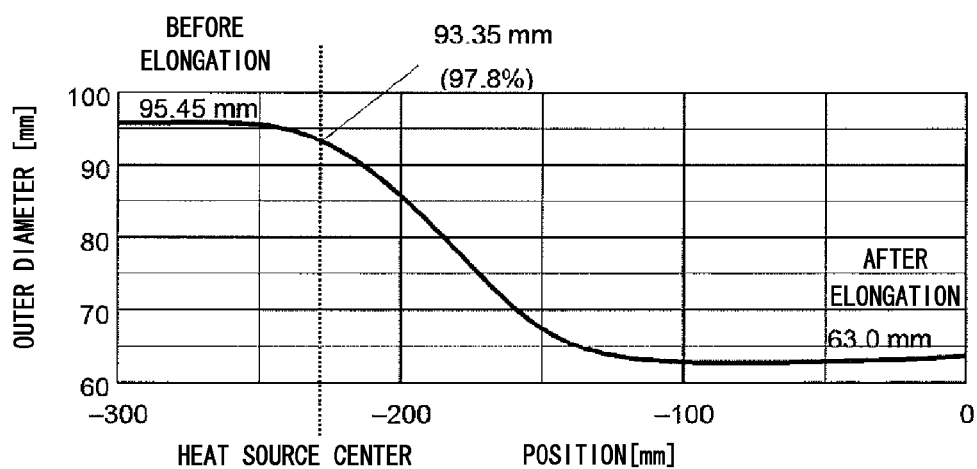
FIG. 6 is a graph showing outer diameter change due to elongation of the glass base material 210.

FIG. 6 is a graph showing the change of the outer diameter before and after elongation in the glass base material 210 during elongation. In the horizontal axis of this graph, the position of the fused portion between glass base material 210 and the dummy rod 222 is set as 0, and positions in the longitudinal direction of the glass base material 210 are indicated by a distance z from this fused portion.

The graph of FIG. 6 shows the change in the outer diameter of the glass base material 210 in front of and behind the heating position 142 of the heat source 140, in a glass base material 210 having a trunk portion 212 with an average outer diameter of 95.45 mm being elongated with elongation conditions to realize a target outer diameter of 63.00 mm. In this glass base material 210, the fluctuation of the outer diameter after elongation has already converged, and the outer diameter after elongation shown on the right side of the graph is stable.

In FIG. 6, when focus is placed on the region where the outer diameter of the glass base material 210 begins to decrease due to the elongation, the heating position 142 of the heat source 140 is seen to be a position occurring after the outer diameter of the glass base material 210 begins to become smaller than the outer diameter of the trunk portion 212 due to the elongation. More specifically, the heating position 142 of the heat source 140 is at a position where the outer diameter is 93.35 mm, which corresponds to 97.8% of the outer diameter of the base material before elongation.

By aligning the heating position 142 of the heat source 140 with the heating position 142 occurring when the elongation is stable from the initial time of the elongation start, the outer diameter fluctuation during the early period of elongation can be restricted. In the above example, when beginning the elongation of the glass base material 210, the elongation begins at a position where the outer diameter is 97.8% of the outer diameter of the trunk portion 212, and therefore the outer diameter fluctuation occurring immediately after the start of elongation can quickly converge.

Furthermore, another glass base material 210 was elongated and, in a state where the outer diameter fluctuation had settled after elongation, the heating position 142 of the heat source 140 was measured. The measurement results are shown in Table 1. As shown in Table 1, in the state where the outer diameter fluctuation has settled, the heating position 142 of the heat source 140 is at a position where the outer diameter is no less than 95% and no more than 98% of the outer diameter of the glass base material 210 before elongation.

TABLE 1

| TEST MATERIAL CODE | AVERAGE OUTER DIAMETER BEFORE ELONGATION [mm] | ELONGATED OUTER DIAMETER [mm] | OUTER DIAMETER OF HEATING POSITION [mm] |
|---|---|---|---|
| A | 95.45 | 63.00 | 93.35 (97.8%) |
| B | 100.20 | 60.00 | 95.30 (95.1%) |
| C | 98.00 | 50.00 | 93.20 (95.1%) |
| D | 96.55 | 50.00 | 92.80 (96.1%) |

Next, four glass base materials 210 for optical fiber that each have a trunk portion 212 with a length of 1000 mm were prepared, and the first to fourth manufacturing examples were manufactured by elongating these four glass base materials 210 to a target outer diameter of 63.00 mm. The ends of each glass base material 210 were respectively fused to dummy rods 222 and 224 with an outer diameter of 60 mm to form glass base material assemblies 200.

Next, the ends of one glass base material assembly 200 were gripped by the chucks 122 and 124 so that the glass base material assembly 200 was held by the glass lathe 100. The diameter measurement device 150 of the glass lathe 100 was used to measure the outer diameter distribution of the glass base material 210 before elongation, in the longitudinal direction of the glass base material 210. A laser diameter measurement device was used as the diameter measurement device 150.

Figure 7:
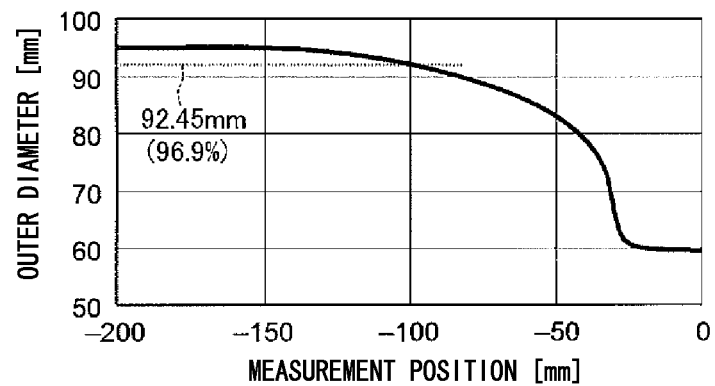
FIG. 7 is a graph showing an outer diameter distribution of the glass base material 210 before elongation.

FIG. 7 is a graph showing the outer diameter distribution of the glass base material 210 described above before elongation. In the horizontal axis of this graph, the position of the fused portion between glass base material 210 and the dummy rod 222 is set as 0, and the measurement position in the longitudinal direction of the glass base material 210 is indicated by a distance z from this fused portion.

As shown in FIG. 7, the glass base material 210 has an outer diameter distribution that changes continuously along the length of the glass base material 210, from the trunk portion 212 to the dummy rod 222. The average outer diameter of the trunk portion 212 of the glass base material 210 is 95.45 mm.

Next, an oxyhydrogen flame burner was used as the heat source 140, and one of the above glass base materials 210 was elongated. First, a position at which the outer diameter of the tapered portion 214 is 92.45 mm was set as the elongation start position. The position with an outer diameter of 92.45 mm set as the elongation start position corresponds to 96.9% of the 95.45 mm average outer diameter of the trunk portion 212. Furthermore, the set elongation start position corresponds to a position of z=−100 mm on the horizontal axis of FIG. 7.

Next, the heating position 142 of the heat source 140 was fixed at a position of z=−40 mm, which is 60 mm from the elongation start position in the direction of the dummy rod 222. The distance of 60 mm between the elongation start position and the heating position 142 corresponds to 62.9% of the average outer diameter of the trunk portion 212.

In this state, the oxyhydrogen flame burner serving as the heat source 140 was ignited, and the glass base material 210 was heated. The oxyhydrogen burner was supplied with 100 L/min of oxygen and 200 L/min of hydrogen. After several minutes, the glass base material 210 was glowing white at the heating position 142, and it was confirmed that the melted and softened portion 216 was beginning to form. The heat source 140 was then moved toward the trunk portion 212 in the longitudinal direction of the glass base material 210, at a velocity of −15 mm/min.

After approximately four minutes, the heating position 142 arrived at a position of z=−100 mm, which is the elongation start position. Accordingly, the one chuck 122 holding the glass base material 210 on the elongation start position side is moved away from the other chuck 124 to increase the distance between the chucks 122 and 124, thereby starting the elongation of the glass base material 210. In other words, since there was a preheating step in this state until the start of the elongation, the chucks 122 and 124 have been fixed until this point, and the glass base material 210 has not been elongated.

A maximum temperature position of the glass base material 210, at which the temperature is a maximum, follows the heating position 142 of the moving heat source 140, and therefore there is a time lag between the two. As a result, the drawing velocity of the chuck 122 causing the elongation of the glass base material 210 may be calculated based on an outer diameter distribution measured in advance at a position offset by 20 mm to the right from the central position of the heat source 140.

More specifically, the outer diameter is 89 mm at z=−80 mm, which is an offset of 20 mm from the central burner position z=−100 mm when elongation is started, and therefore the drawing velocity of the chucks at the start of elongation is +7.5 mm/min. After this, the distance between chucks is gradually expanded at a drawing speed calculated based on the outer diameter of the glass base material measured in advance at the position resulting from an offset of 20 mm being added to the central position of the burner in the same manner, thereby perform elongation until reaching the elongation end position.

Figure 8:
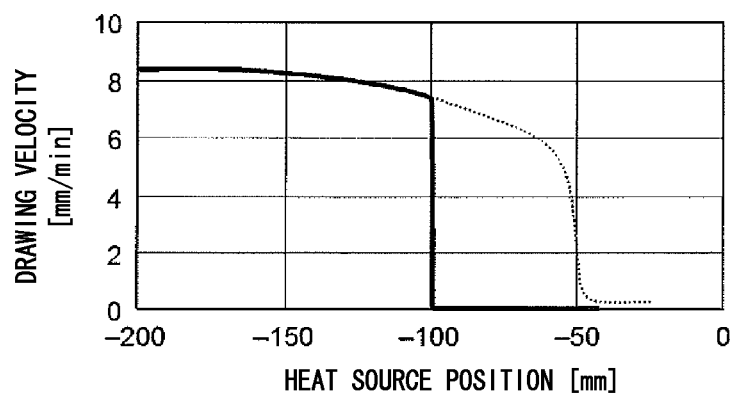
FIG. 8 is a graph showing the relationship between drawing velocity and heating position 142 of the glass base material 210.

FIG. 8 is a graph showing the relationship between the heating position 142 of the heat source 140 indicated by the distance z and the drawing velocity $V_t(z)$ of the chuck 122, before and after the start of elongation. FIG. 8 also includes the outer diameter distribution of the glass base material 210 shown in FIG. 7, indicated by a dotted line. In the horizontal axis of this graph, the position of the fused portion between the glass base material 210 and the dummy rod 222 is set as 0, and the heating position 142 in the longitudinal direction of the glass base material 210 is indicated by a distance z from this fused portion.

As shown in FIG. 8, the heating position 142 is fixed at the chuck 122 until reaching the position z=−100, which is the elongation start position. Furthermore, when the heating position 142 reaches the position z=−100, which is the elongation start position, the chuck 122 begins moving and continues moving at substantially the same velocity until reaching the elongation end position. In this way, the glass base material 210 according to the first manufacturing example was elongated.

Figure 9:
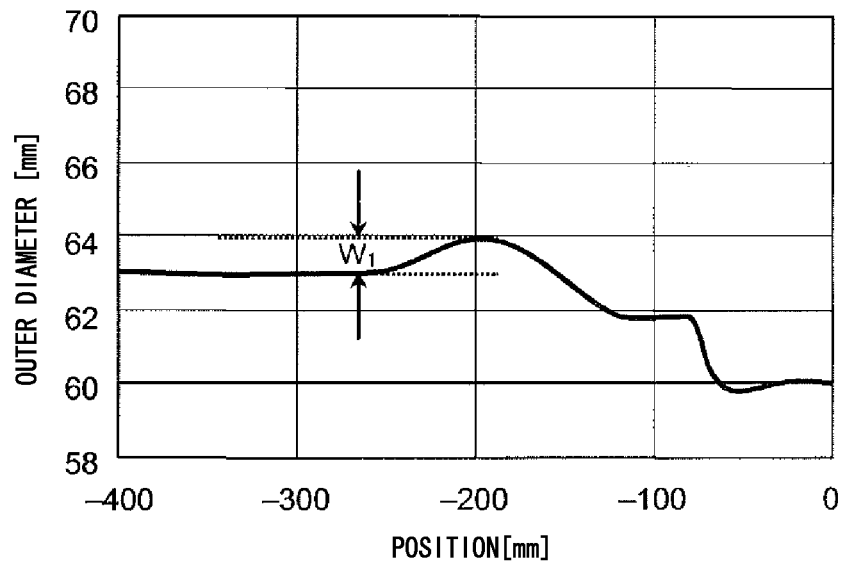
FIG. 9 is a graph showing outer diameter distribution after elongation at an elongation start end of the glass base material 210.

FIG. 9 is a graph showing the outer diameter distribution of the glass base material 210 elongated according to the first manufacturing example. In the horizontal axis of this graph, the position of the fused portion between glass base material 210 and the dummy rod 222 is set as 0, and positions in the longitudinal direction of the glass base material 210 are indicated by a distance z from this fused portion.

FIG. 9 shows an outer diameter distribution of the glass base material 210 near the end on the elongation start side. The outer diameter distribution of the glass base material 210 was measured using the diameter measurement device 150 provided to the glass lathe 100, in the same manner as the outer diameter distribution before elongation.

In the elongated glass base material 210, the average outer diameter of the trunk portion 212 was 63.00 mm. Furthermore, in the elongated glass base material 210, the maximum outer diameter of the portion elongated during the initial period of elongation was 64.01 mm. Here, with the difference $W_1$ between the average outer diameter and the maximum outer diameter being an indicator of the magnitude of outer diameter fluctuation in the elongated glass base material, the outer diameter fluctuation of the glass base material 210 according to the first manufacturing example can be calculated to be 1.01 mm.

In addition, the remaining three glass base materials 210 were elongated to manufacture second to fourth manufacturing examples. Each of the glass base materials 210 according to the second to fourth manufacturing examples has a unique outer diameter distribution. Furthermore, the target outer diameter of the elongation was changed for each glass base material 210 when the glass base materials according to the second to fourth manufacturing examples were manufactured.

The dummy rods 222 and 224 fused to the glass base material 210 to be elongated were the same as those used in the case of the first manufacturing example. The outer diameter distribution measurement procedure before and after elongation using the diameter measurement device 150, the movement velocity of the heat source 140 during the preheating and elongating steps, and the like use the same values as in the first manufacturing example. In contrast, the drawing velocity $V_t(z)$ of the chuck 122 was determined based on the outer diameter distribution measured for each glass base material 210.

The average outer diameter of the trunk portion 212 before elongation, the target outer diameter of the elongation, the heating position 142 at the time when elongation begins, and the outer diameter fluctuation during the initial period of elongation for each of the first to fourth manufacturing examples are shown in Table 2, along with the values of the first manufacturing example. As shown in Table 2, when the heating position 142 at the time when the elongation begins is at a position that is from approximately 95% to 97% of the average outer diameter of the trunk portion 212, the outer diameter fluctuation of the portion elongated during the initial elongation period settles to approximately 1 mm.

TABLE 2

| | | AVERAGE OUTER DIAMETER BEFORE ELONGATION [mm] | TARGET OUTER DIAMETER [mm] | HEATING POSITION AT START OF ELONGATION (PERCENTAGE OF AVERAGE OUTER DIAMETER) | OUTER DIAMETER FLUCTUATION IN INITIAL ELONGATION PERIOD [mm] |
|---|---|---|---|---|---|
| MANUFACTURING EXAMPLE | 1 | 95.45 | 63.00 | 92.45 mm (96.9%) | 1.01 |
| | 2 | 94.75 | 62.00 | 92.35 mm (97.5%) | 1.02 |
| | 3 | 98.30 | 70.00 | 93.10 mm (94.7%) | 0.96 |
| | 4 | 98.10 | 65.00 | 93.60 mm (95.4%) | 1.11 |

In the same manner as the first to fourth manufacturing examples, four glass base materials 210 having different target outer diameters and average outer diameters for the trunk portion 212 before elongation were prepared and elongated to manufacture first to fourth comparative examples. The difference relative to the elongation used in the first manufacturing example is found in the heating position 142 on the glass base material 210 caused by the heat source 140 at the time when elongation begins. In other words, in the elongation of the first to fourth comparative examples, the heating position 142 at the time when elongation begins is changed within a wider range.

In the same manner as the first to fourth manufacturing examples, four glass base materials 210 were individually elongated to manufacture first to fourth comparative examples. Each of the glass base materials 210 according to the first to fourth comparative examples have a unique outer diameter distribution. Furthermore, the target outer diameter of the elongation was changed for each glass base material 210 when the glass base materials 210 according to the first to fourth comparative examples were manufactured.

The dummy rods 222 and 224 fused to the glass base material 210 to be elongated were the same as those used in the case of the first manufacturing example. The outer diameter distribution measurement procedure before and after elongation using the diameter measurement device 150, the movement velocity of the heat source 140 during the preheating and elongating steps, and the like use the same values as in the first manufacturing example. In contrast, the drawing velocity $V_z(z)$ of the chuck 122 was determined based on the outer diameter distribution measured for each glass base material 210.

Figure 10:
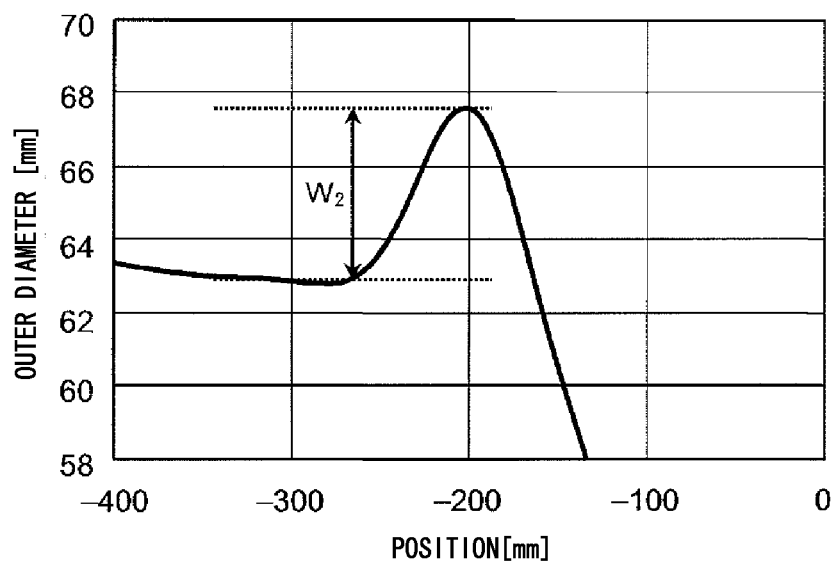
FIG. 10 is a graph showing outer diameter distribution after elongation at an elongation start end of the glass base material 210.

FIG. 10 is a graph showing the outer diameter distribution after elongation of the glass base material 210 according to the first comparative example. In the horizontal axis of this graph, the position of the fused portion between glass base material 210 and the dummy rod 222 is set as 0, and positions in the longitudinal direction of the glass base material 210 are indicated by a distance z from this fused portion.

FIG. 10 shows an outer diameter distribution of the glass base material 210 near the end on the elongation start side. The outer diameter distribution of the glass base material 210 was measured using the diameter measurement device 150 provided to the glass lathe 100, in the same manner as the outer diameter distribution before elongation.

In the elongated glass base material 210 according to the first comparative example, the average outer diameter of the trunk portion 212 was 62.89 mm. Furthermore, in the elongated glass base material 210, the maximum outer diameter of the portion elongated during the initial period of elongation was 67.46 mm. Here, the difference $W_2$ between the average outer diameter and the maximum outer diameter is an indicator of the magnitude of outer diameter fluctuation in the elongated glass base material, and therefore the outer diameter fluctuation of the glass base material 210 according to the first comparative example can be calculated to be 4.57 mm. In the same manner, glass base materials 210 according to the second to fourth comparative examples were elongated and measured.

The average outer diameter of the trunk portion 212 before elongation, the target outer diameter of the elongation, the heating position 142 at the time when elongation begins, and the outer diameter fluctuation during the initial period of elongation for each of the first to fourth comparative examples are shown in Table 3. As shown in Table 3, when the heating position 142 at the time when the elongation begins is at a position that is less than 85% of the average outer diameter of the trunk portion 212, the outer diameter fluctuation of the portion elongated during the initial elongation period exceeds 4 mm.

Furthermore, when the heating position 142 at the time when the elongation begins is at a position that is more than 99% of the average outer diameter of the trunk portion 212, the outer diameter fluctuation of the portion elongated during the initial elongation period exceeds 4 mm. When the outer diameter fluctuation is this large, if the elongated glass base material 210 is further drawn to form an optical fiber or the like, there is a decrease in yield that cannot be ignored.

TABLE 3

| | | AVERAGE OUTER DIAMETER BEFORE ELONGATION [mm] | TARGET OUTER DIAMETER [mm] | HEATING POSITION AT START OF ELONGATION (PERCENTAGE OF AVERAGE OUTER DIAMETER) | OUTER DIAMETER FLUCTUATION IN INITIAL ELONGATION PERIOD [mm] |
|---|---|---|---|---|---|
| COMPARATIVE EXAMPLES | 1 | 95.20 | 63.00 | 80.90 mm (85.0%) | 4.57 |

TABLE 3-continued

|  | AVERAGE OUTER DIAMETER BEFORE ELONGATION [mm] | TARGET OUTER DIAMETER [mm] | HEATING POSITION AT START OF ELONGATION (PERCENTAGE OF AVERAGE OUTER DIAMETER) | OUTER DIAMETER FLUCTUATION IN INITIAL ELONGATION PERIOD [mm] |
|---|---|---|---|---|
| 2 | 94.85 | 62.00 | 80.65 mm (85.0%) | 4.18 |
| 3 | 98.05 | 70.00 | 98.00 mm (99.9%) | 5.12 |
| 4 | 98.35 | 65.00 | 98.40 mm (100.1%) | 4.65 |

In the same manner as the first to fourth comparative examples, four glass base materials 210 having different target outer diameters and average outer diameters for the trunk portion 212 before elongation were prepared and elongated to manufacture fifth to eighth manufacturing examples. In the same manner as in the first manufacturing example, the ends of each glass base material 210 were respectively fused to dummy rods 222 and 224 with an outer diameter of 60 mm, and the dummy rods 222 and 224 were gripped by the chucks 122 and 124 to be held by the glass lathe 100, thereby being mounted in the glass lathe 100. An oxyhydrogen flame burner was used as the heat source 140 and outer diameter distribution of the glass base material 210 in the longitudinal direction was measured using the diameter measurement device 150 arranged near the heat source 140.

The difference in the elongation of the fifth to eighth manufacturing examples relative to the elongation used in the first manufacturing example is that preheating is performed before starting the elongation. In the case of the fifth manufacturing example, the heating position 142 of the heat source 140 at the time when elongation begins is set to a position where the glass base material 210 has an outer diameter corresponding to 96.0% of the average outer diameter of the trunk portion 212 of the glass base material 210 before the elongation, based on the results of a measurement of the outer diameter distribution of the glass base material 210 measured in advance. Furthermore, before elongation is begun, the position at which the preheating of the glass base material 210 begins is set to be within a range between positions that are no less than 100% and no more than 200% of the average outer diameter before elongation relative to the position at which elongation begins. When the preheating start position is near a distance that is 200% of the average outer diameter before elongation, the preheating step is begun with heating of the dummy rod 222.

The dummy rods 222 and 224 fused to each glass base material 210 were the same as those used in the case of the first manufacturing example. The outer diameter distribution measurement procedure before and after elongation using the diameter measurement device 150, the movement velocity of the heat source 140 during the preheating and elongating steps, and the like use the same values as in the first manufacturing example. In contrast, the drawing velocity $V_t(z)$ of the chuck 122 was determined based on the outer diameter distribution measured for each glass base material 210.

The average outer diameter of the trunk portion 212 before elongation, the target outer diameter of the elongation, the heating position 142 at the time when elongation begins, and the outer diameter fluctuation during the initial period of elongation for each of the fifth to eighth manufacturing examples are shown in Table 4. As shown in Table 4, when the preheating start position corresponds to a position from 100% to 200% of the outer diameter of the glass base material before elongation, when the glass base material 210 is elongated, the outer diameter fluctuation of the portion elongated during the initial elongation period settles around 1 mm.

TABLE 4

|  |  | AVERAGE OUTER DIAMETER BEFORE ELONGATION [mm] | TARGET OUTER DIAMETER [mm] | PREHEATING START DISTANCE (RELATIVE TO AVERAGE OUTER DIAMETER) | OUTER DIAMETER FLUCTUATION IN INITIAL ELONGATION PERIOD [mm] |
|---|---|---|---|---|---|
| MANUFACTURING EXAMPLES | 5 | 94.90 | 70.00 | 95 mm (100%) | 0.99 |
|  | 6 | 95.20 | 70.00 | 190 mm (200%) | 0.95 |
|  | 7 | 92.15 | 65.00 | 95 mm (100%) | 1.01 |
|  | 8 | 92.40 | 65.00 | 190 mm (200%) | 1.05 |

Glass base materials 210 according to the fifth and sixth comparative examples were manufactured using the same procedures and elongation conditions as the fifth to eighth manufacturing examples, except that the preheating start positions were set respectively to 25% and 10.5% of the average outer diameter of the trunk portion 212 of the glass base material 210 before elongation.

The average outer diameter of the trunk portion 212 before elongation, the target outer diameter of the elongation, the heating position 142 at the time when elongation begins, and the outer diameter fluctuation during the initial period of elongation for each of the fifth and sixth comparative examples are shown in Table 5. As shown in Table 5, when the distance from the elongation start position to the preheating start position is less than 50% of the average outer diameter before elongation, the outer diameter fluctuation of the portion elongated during the initial elongation period exceeds 5 mm. Therefore, when the elongated glass base material 210 is further drawn to form an optical fiber or the like, there is a decrease in yield that cannot be ignored.

TABLE 5

| | | AVERAGE OUTER DIAMETER BEFORE ELONGATION [mm] | TARGET OUTER DIAMETER [mm] | PREHEATING START DISTANCE (RELATIVE TO AVERAGE OUTER DIAMETER) | OUTER DIAMETER FLUCTUATION IN INITIAL ELONGATION PERIOD [mm] |
|---|---|---|---|---|---|
| COMPARATIVE EXAMPLES | 5 | 94.85 | 70.00 | 24 mm (25%) | 5.85 |
| | 6 | 95.25 | 70.00 | 10 mm (10.5%) | 6.20 |

In the manner described above, by starting the elongation of the glass base material 210 at a position where the outer diameter of the tapered portion 214 of the glass base material 210 is greater than or equal to 95% and less than or equal to 98% of the average outer diameter of the trunk portion 212, the outer diameter fluctuation during the initial elongation period can be restricted.

If elongation of the glass base material 210 is started at a position that is less than 95% of the average outer diameter of the trunk portion 212 before elongation, segments with excessive elongation occur in the glass base material 210 immediately after elongation starts, which makes outer diameter fluctuation after elongation more likely. Furthermore, if elongation of the glass base material 210 is started at a position that is more than 98% of the average outer diameter of the trunk portion 212 before elongation, segments with insufficient elongation occur in the glass base material 210 immediately after elongation starts, which makes outer diameter fluctuation after elongation more likely.

By forming the cross-sectional shape of the tapered portion 214 of the glass base material 210 to have the pattern of the cross-sectional shape of the glass base material 210 in which elongation progresses stably, such as shown in FIG. 7, a state in which the glass base material 210 is elongated stably after the start of elongation can be realized quickly. Therefore, the outer diameter of the glass base material 210 immediately after the start of elongation can be made more stable. Accordingly, the outer diameter fluctuation of the glass base material 210 after elongation can be restricted, thereby improving the yield when manufacturing an optical fiber or the like by drawing the glass base material 210.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A glass base material elongating method comprising:
    holding, with a pair of chucks, longitudinal ends of a glass base material that has a trunk portion and a tapered portion, which is located on one end of the trunk portion and has an outer diameter that changes along a longitudinal direction;
    heating, with a heat source, a heated region that is a portion in the longitudinal direction of the glass base material held by the pair of chucks; and
    elongating the glass base material by increasing distance between the pair of chucks in the longitudinal direction of the glass base material, with a portion of the glass base material being in a softened state due to the heating by the heat source, wherein
    the elongating begins from a state in which a position of the heat source indicated by a center of the heated region is at an elongation start position, which is a position in the tapered portion at which the outer diameter of the glass base material is set in a range from no less than 95% to no more than 98% of an average outer diameter of the trunk portion,
    the glass base material elongating method further comprises, before the heating, preheating while moving the heat source from a preheating start position, which is farther from the trunk portion than the elongation start position, toward the elongation start position, wherein
    the preheating start position is distanced from the elongation start position by a distance greater than or equal to 50% of the average outer diameter of the trunk portion.

2. The glass base material elongating method according to claim 1, wherein
    the holding includes fusing a dummy rod to the glass base material, at an end of the tapered portion that is opposite the trunk portion, and holding the glass base material via the dummy rod by at least one of the pair of chucks,
    the dummy rod has an outer diameter that is less than or equal to a target outer diameter after the elongating, and
    the outer diameter of the glass base material at the tapered portion changes continuously in a direction from the trunk portion toward the dummy rod.

3. The glass base material elongating method according to claim 1, wherein
    the preheating includes moving the heat source in the longitudinal direction of the glass base material, with the glass base material fixed.

4. The glass base material elongating method according to claim 1, wherein
the elongating includes moving the heat source in the longitudinal direction relative to the glass base material, and elongating the entire length of the glass base material.

5. The glass base material elongating method according to claim 1, wherein
the heating includes heating the glass base material held by the pair of chucks while rotating the glass base material on a rotational axis extending in the longitudinal direction of the glass base material.

6. The glass base material elongating method according to claim 1, wherein
the heating includes heating the glass base material with an oxyhydrogen flame burner.

7. The glass base material elongating method according to claim 1, further comprising, prior to the heating, measuring an outer diameter distribution of the glass base material along the longitudinal direction of the glass base material.

8. The glass base material elongating method according to claim 7, wherein
elongation conditions of the glass base material, which include heating amount of the heat source, relative movement velocity of the glass base material and the heat source, and movement velocity of at least one of the pair of chucks, are set prior to the elongating based on the outer diameter distribution of the glass base material acquired by the measurement.

9. The glass base material elongating method according to claim 7, wherein
the measuring includes measuring the outer diameter of the glass base material with a laser diameter measurement device.

10. A glass base material elongating method comprising:
holding, with a pair of chucks, longitudinal ends of a glass base material that has a trunk portion and a tapered portion, which is located on one end of the trunk portion and has an outer diameter that changes along a longitudinal direction;
heating, with a heat source, a heated region that is a portion in the longitudinal direction of the glass base material held by the pair of chucks; and
elongating the glass base material by increasing distance between the pair of chucks in the longitudinal direction of the glass base material, with a portion of the glass base material being in a softened state due to the heating by the heat source, wherein
the elongating begins from a state in which a position of the heat source indicated by a center of the heated region is at an elongation start position, which is a position in the tapered portion at which the outer diameter of the glass base material is set in a range from no less than 95% to no more than 98% of an average outer diameter of the trunk portion,
the glass base material elongating method further comprises, before the heating, preheating while moving the heat source from a preheating start position, which is farther from the trunk portion than the elongation start position, toward the elongation start position, wherein
the preheating start position is distanced from the elongation start position by a distance greater than or equal to 100% of the average outer diameter of the trunk portion and less than or equal to 200% of the average outer diameter of the trunk portion.

11. The glass base material elongating method according to claim 10, wherein
the holding includes fusing a dummy rod to the glass base material, at an end of the tapered portion that is opposite the trunk portion, and holding the glass base material via the dummy rod by at least one of the pair of chucks,
the dummy rod has an outer diameter that is less than or equal to a target outer diameter after the elongating, and
the outer diameter of the glass base material at the tapered portion changes continuously in a direction from the trunk portion toward the dummy rod.

12. The glass base material elongating method according to claim 10, wherein
the preheating includes moving the heat source in the longitudinal direction of the glass base material, with the glass base material fixed.

13. The glass base material elongating method according to claim 10, wherein
the elongating includes moving the heat source in the longitudinal direction relative to the glass base material, and elongating the entire length of the glass base material.

14. The glass base material elongating method according to claim 10, wherein
the heating includes heating the glass base material held by the pair of chucks while rotating the glass base material on a rotational axis extending in the longitudinal direction of the glass base material.

15. The glass base material elongating method according to claim 10, wherein
the heating includes heating the glass base material with an oxyhydrogen flame burner.

16. The glass base material elongating method according to claim 10, further comprising, prior to the heating, measuring an outer diameter distribution of the glass base material along the longitudinal direction of the glass base material.

17. The glass base material elongating method according to claim 16, wherein
elongation conditions of the glass base material, which include heating amount of the heat source, relative movement velocity of the glass base material and the heat source, and movement velocity of at least one of the pair of chucks, are set prior to the elongating based on the outer diameter distribution of the glass base material acquired by the measurement.

18. The glass base material elongating method according to claim 16, wherein
the measuring includes measuring the outer diameter of the glass base material with a laser diameter measurement device.

* * * * *